(12) United States Patent
Wan et al.

(10) Patent No.: US 9,321,009 B2
(45) Date of Patent: *Apr. 26, 2016

(54) EMISSIONS TREATMENT SYSTEM WITH AMMONIA-GENERATING AND SCR CATALYSTS

(71) Applicant: BASF Corporation, Florham Park, NJ (US)

(72) Inventors: Chung-Zong Wan, Somerset, NJ (US); Xiaolai Zheng, Princeton Junction, NJ (US); Susanne Stiebels, Adenbüttel (DE); Claudia Wendt, Hannover (DE); Torsten Neubauer, Langenhagen (DE); R. Samuel Boorse, Skillman, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,216

(22) Filed: Oct. 4, 2013

(65) Prior Publication Data

US 2014/0047819 A1 Feb. 20, 2014

Related U.S. Application Data

(63) Continuation of application No. 12/750,001, filed on Mar. 30, 2010.

(60) Provisional application No. 61/166,584, filed on Apr. 3, 2009.

(51) Int. Cl.
*B01D 50/00* (2006.01)
*B01D 47/00* (2006.01)
(Continued)

(52) U.S. Cl.
CPC ........ *B01D 53/9431* (2013.01); *B01D 53/9472* (2013.01); *B01D 53/9477* (2013.01);
(Continued)

(58) Field of Classification Search
CPC .......... B01D 53/9481; B01D 53/9472; B01D 2255/102; B01D 2255/206; B01D 2253/00; B01D 53/9418; B01D 53/9436; F01N 3/033; F01N 3/035; F01N 3/0842; F01N 3/2066
USPC ................... 422/177, 180; 60/274, 286, 287; 502/64, 102, 223
See application file for complete search history.

(56) References Cited

U.S. PATENT DOCUMENTS

| 4,308,841 | A | 1/1982 | Kingsley |
| 4,329,162 | A | 5/1982 | Pitcher, Jr. |

(Continued)

FOREIGN PATENT DOCUMENTS

| CN | 1059701 A | 3/1992 |
| DE | 10-2005-005663 | 8/2006 |

(Continued)

OTHER PUBLICATIONS

Final Office Action in U.S. Appl. No. 12/750,001, dated Feb. 28, 2013, 11 pgs.

(Continued)

*Primary Examiner* — Tom P Duong
(74) *Attorney, Agent, or Firm* — Womble Carlyle Sandridge & Rice, LLP

(57) ABSTRACT

Provided are emissions treatment systems for an exhaust stream having an ammonia-generating component, such as a NOx storage reduction (NSR) catalyst or a lean NOx trap (LNT) catalyst, and an SCR catalyst disposed downstream of the ammonia-generating catalyst. The SCR catalyst can be a molecular sieve having the CHA crystal structure, for example SSZ-13 or SAPO-34, which can be ion-exchanged with copper. The LNT can be layered, having an undercoat washcoat layer comprising a support material, at least one precious metal, and at least one NOx sorbent selected from the group consisting of alkaline earth elements, rare earth elements, and combinations thereof and a top washcoat layer comprising a support material, at least one precious metal, and ceria in particulate form, the top washcoat layer being substantially free of alkaline earth components. The emissions treatment system is advantageously used for the treatment of exhaust streams from diesel engines and lean burn gasoline engines.

27 Claims, 5 Drawing Sheets

(51) Int. Cl.
  *B01D 53/94* (2006.01)
  *F01N 3/035* (2006.01)
  *F01N 3/08* (2006.01)
  *F01N 3/20* (2006.01)
  *F01N 3/10* (2006.01)
  *F01N 13/02* (2010.01)

(52) U.S. Cl.
  CPC .............. *F01N3/035* (2013.01); *F01N 3/0807* (2013.01); *F01N 3/0814* (2013.01); *F01N 3/0842* (2013.01); *F01N 3/10* (2013.01); *F01N 3/2066* (2013.01); *F01N 3/2073* (2013.01); *F01N 13/02* (2013.01); *B01D 53/9418* (2013.01); *B01D 53/9422* (2013.01); *B01D 2251/2062* (2013.01); *B01D 2255/102* (2013.01); *B01D 2255/206* (2013.01); *B01D 2255/2042* (2013.01); *B01D 2255/2045* (2013.01); *B01D 2255/2063* (2013.01); *B01D 2255/2066* (2013.01); *B01D 2255/2068* (2013.01); *B01D 2255/2092* (2013.01); *B01D 2255/20753* (2013.01); *B01D 2255/20761* (2013.01); *B01D 2255/50* (2013.01); *B01D 2255/9022* (2013.01); *B01D 2255/91* (2013.01); *B01D 2255/9155* (2013.01); *B01D 2255/9205* (2013.01); *B01D 2258/012* (2013.01); *F01N 2510/063* (2013.01); *F01N 2510/0682* (2013.01); *Y02T 10/24* (2013.01)
  USPC .......................................... 422/177; 423/210

(56) References Cited

U.S. PATENT DOCUMENTS

| | | | |
|---|---|---|---|
| 4,440,871 A | 4/1984 | Lok et al. |
| 4,544,538 A | 10/1985 | Zones |
| 4,750,465 A | 6/1988 | Rediker, Jr. et al. |
| 4,877,001 A | 10/1989 | Kenealy et al. |
| 4,961,917 A | 10/1990 | Byrne |
| 4,985,210 A | 1/1991 | Minami |
| 5,051,244 A | 9/1991 | Dunne et al. |
| 5,057,483 A | 10/1991 | Wan |
| 5,125,231 A | 6/1992 | Patil et al. |
| 5,158,753 A | 10/1992 | Take et al. |
| 5,471,836 A | 12/1995 | Takeshima et al. |
| 5,516,497 A | 5/1996 | Speronello et al. |
| 5,783,160 A | 7/1998 | Kinugasa et al. |
| 5,964,088 A | 10/1999 | Kinugasa et al. |
| 6,089,015 A | 7/2000 | Strehlau et al. |
| 6,109,024 A | 8/2000 | Kinugasa et al. |
| 6,119,452 A | 9/2000 | Kinugasa et al. |
| 6,171,556 B1 | 1/2001 | Burk et al. |
| 6,176,079 B1 | 1/2001 | Konrad et al. |
| 6,182,443 B1 | 2/2001 | Jarvis et al. |
| 6,216,448 B1 | 4/2001 | Schnaibel et al. |
| 6,334,986 B2 | 1/2002 | Gieshoff et al. |
| 6,338,244 B1 | 1/2002 | Guenther et al. |
| 6,345,496 B1 | 2/2002 | Fuwa et al. |
| 6,689,709 B1 | 2/2004 | Tran et al. |
| 6,699,448 B2 | 3/2004 | Wu et al. |
| 6,709,644 B2 | 3/2004 | Zones et al. |
| 6,725,647 B2 | 4/2004 | Pfeifer et al. |
| 6,732,507 B1 | 5/2004 | Stanglmaier et al. |
| 6,753,294 B1 | 6/2004 | Brisley et al. |
| 6,766,642 B2 | 7/2004 | Binder et al. |
| 6,777,370 B2 | 8/2004 | Chen |
| 6,820,415 B2 | 11/2004 | Abet et al. |
| 7,062,904 B1 | 6/2006 | Hu et al. |
| 7,094,389 B2 | 8/2006 | Cao et al. |
| 7,178,331 B2 | 2/2007 | Blakeman et al. |
| 7,251,929 B2 | 8/2007 | Hu et al. |
| 7,332,135 B2 | 2/2008 | Gandhi et al. |
| 7,431,895 B2 | 10/2008 | Pfeifer et al. |
| 7,490,464 B2 | 2/2009 | Li et al. |
| 7,998,443 B2 | 8/2011 | Andersen et al. |
| 8,101,147 B2 | 1/2012 | Andersen et al. |
| 8,182,777 B2 | 5/2012 | Andersen et al. |
| 2002/0043156 A1 | 4/2002 | Shea |
| 2003/0056499 A1 | 3/2003 | Binder et al. |
| 2004/0040287 A1 | 3/2004 | Beutel et al. |
| 2004/0052699 A1 | 3/2004 | Molinier et al. |
| 2004/0076565 A1 | 4/2004 | Gandhi et al. |
| 2004/0151645 A1 | 8/2004 | Li |
| 2004/0175305 A1 | 9/2004 | Nakanishi et al. |
| 2004/0182070 A1 | 9/2004 | Goralski et al. |
| 2005/0031514 A1 | 2/2005 | Patchett et al. |
| 2006/0039843 A1 | 2/2006 | Patchett et al. |
| 2006/0115403 A1 | 6/2006 | Yuen |
| 2006/0153761 A1 | 7/2006 | Bandl-Konrad et al. |
| 2006/0260296 A1 | 11/2006 | Theis |
| 2006/0293547 A1 | 12/2006 | Mertens |
| 2007/0012032 A1 | 1/2007 | Hu |
| 2007/0081934 A1 | 4/2007 | Hubig et al. |
| 2007/0110650 A1 | 5/2007 | Pfeifer et al. |
| 2007/0130915 A1 | 6/2007 | Beckmann et al. |
| 2007/0175208 A1 | 8/2007 | Bandl-Konrad et al. |
| 2007/0224093 A1 | 9/2007 | Miyairi et al. |
| 2007/0269353 A1 | 11/2007 | Li et al. |
| 2007/0271908 A1 | 11/2007 | Hemingway et al. |
| 2007/0277507 A1 | 12/2007 | Yan |
| 2008/0034740 A1 | 2/2008 | Strehlau et al. |
| 2008/0053071 A1 | 3/2008 | Adams et al. |
| 2008/0155972 A1 | 7/2008 | Driscoll et al. |
| 2008/0202107 A1 | 8/2008 | Boorse et al. |
| 2008/0241060 A1 | 10/2008 | Li et al. |
| 2008/0282670 A1 | 11/2008 | McCarthy, Jr. et al. |
| 2008/0295498 A1 | 12/2008 | Morita et al. |
| 2009/0196812 A1 | 8/2009 | Bull et al. |
| 2010/0290963 A1 | 11/2010 | Andersen et al. |

FOREIGN PATENT DOCUMENTS

| | | |
|---|---|---|
| EP | 1110593 A1 | 6/2001 |
| EP | 1147802 | 10/2001 |
| EP | 1250952 | 10/2002 |
| EP | 1431534 | 6/2004 |
| EP | 0773354 | 5/2007 |
| FR | 2822498 | 9/2002 |
| FR | 2849672 | 7/2004 |
| JP | 2006272288 | 10/2006 |
| JP | 2007-527314 | 9/2007 |
| JP | 2012-518537 | 8/2012 |
| WO | WO-97/17532 | 5/1997 |
| WO | WO-2004/061278 | 7/2004 |
| WO | WO-2004/071646 | 8/2004 |
| WO | WO-2005/047663 | 5/2005 |
| WO | WO-2008/106519 | 9/2008 |
| WO | WO-2008/106523 | 9/2008 |
| WO | WO-2008/132452 | 11/2008 |
| WO | WO-2009/024215 | 2/2009 |
| WO | WO-2009/043425 | 4/2009 |
| WO | WO-2009/080152 | 7/2009 |
| WO | WO-2010/097638 | 9/2010 |

OTHER PUBLICATIONS

Non Final Office Action in U.S. Appl. No. 10/975,428, of May 14, 2007, 9 pgs.
Non-Final Office Action in U.S. Appl. No. 12/750,001, dated Jul. 27, 2012, 28 pgs.
PCT International Preliminary Report on Patentability in PCT/US2010/029329, issued Oct. 4, 2011, 7 pgs.
PCT International Search Report in PCT/US2010/029329, mailed Nov. 16, 2010, 4 pgs.
PCT Written Opinion in PCT/US2010/029329, mailed Nov. 16, 2010, 6 pgs.
Extended European Search Report in EP10759326, dated Jun. 10, 2014, 6 pages.
*Andersen v. Wan*, Corrected Declaration of Interference, Patent Interference No. 105,991, filed Mar. 10, 2014, 12 pages.
*Andersen v. Wan*, Declaration of Interference, Patent Interference No. 105,991, filed Jan. 28, 2014, 11 pages.

(56) References Cited

OTHER PUBLICATIONS

*Andersen v. Wan*, Declaration of Interference, Patent Interference No. 106,002, filed Apr. 3, 2014, 11 pages.

Interference No. 106,002 Exhibit 2044, Ashtekar, Sunil, et al., Small-Pore Molecular Sieves SAPO-34 and SAPO-44 with Chabazite Structure: A Study of Silicon Incorporation, *J. Phys. Chem. vol. 98* 1994, 4878-4883.

Interference No. 106,002 Exhibit 2031, Chen, N.Y., et al., Preparation of Dealuminized Mordenite, *Inorganic Chemistry* vol. 15 No. 2 1976, 295-297.

Interference No. 106,002 Exhibit 2041, Clayton, Robert D., et al., NOx storage and reduction with H2 on Pt/BaO/Al2O3 monolith: Spatio-temporal resolution of product distribution, *Applied Catalysis B: Environmental* vol. 84 2008, 616-630.

Interference No. 106,002 Exhibit 2040, Cumaranatunge, L., et al., Ammonia is a hydrogen carrier in the regeneration of Pt/BaO/Al2O3 NOx traps with H2, *Journal of Catalysis* vol. 246 2007, 29-34.

Interference No. 106,002 Exhibit 1035, Dedecek, Jiri, et al., Effect of Framework Charge Density on Catalytic Activity of Copper Loaded Molecular Sieves of Chabazite Structure in Nitrogen(II) Oxide Decomposition, *Collect. Czech. Chem. Commun.* vol. 65 2000, 343-351.

Interference No. 106,002 Exhibit 1032, Dedecek, J., et al., Siting of the Cu+ ions in dehydrated ion exchanged synthetic and natural chabasites: a Cu+ photoluminescence study, *Microporous and Mesoporous Materials* vol. 32 1999, 63-74.

Interference No. 106,002 Exhibit 2030, Elangovan, S.P., et al., Silicoaluminophosphate molecular sieves as a hydrocarbon trap, *Applied Catalysis B: Environmental* vol. 57 2005, 31-36.

Interference No. 106,002 Exhibit 2038, Epling, William S., et al., Further evidence of multiple NOx sorption sites on NOx storage/reduction catalysts, *Catalysis Today* vol. 96 2004, 21-30.

Interference No. 106,002 Exhibit 2039, Epling, William S., et al., The effects of regeneration conditions on NOx and NH3 release from NOx storage/reduction catalysts, *Applied Catalysis B: Environmental* vol. 74 2007, 117-129.

Interference No. 105,991 Exhibit 1017, Frache, A., et al., CuAPSO-34 catalysts for N20 decomposition in the presence of H2O. A study of zeolitic structure stability in comparison to Cu-SAPO-34 and Cu-ZSM-5, *Topics in Catalysis* vol. 22, Nos. 1|2 Jan. 2003, 53-57.

Interference Nos. 105,991 and 106,002 Exhibit 1015, Huang, Yinyan, et al., Deactivation of Cu/Zeolite SCR Catalyst Due to Reductive Hydrothermal Aging, *SAE International* 2008, 5 pages.

Interference No. 106,002 Exhibit 1033 and Exhibit 2032, Ishihara, Tatsumi, et al., Copper Ion-Exchanged SAPO-34 as a Thermostable Catalyst for Selective Reduction of NO with C3H6, *Journal of Catalysis* vol. 169 1997, 93-102.

Interference No. 106,002 Exhibit 2045, Ji, Yaying, et al., Effect of Ceria on the Storage and Regeneration Behavior of a Model Lean NOx Trap Catalyst, *Catal. Lett.* vol. 119 2007, 257-264.

Interference No. 106,002 Exhibit 2036, Kabin, Karen S., et al., Monolith and TAP reactor studies of NOx storage on Pt/BaO/Al2O3: Elucidating the mechanistic pathways and roles of Pt, *Catalysis Today* vol. 114 2006, 72-85.

Interference No. 106,002 Exhibit 2043, Lok, Brent M., et al., Silicoaluminophosphate Molecular Sieves: Another New Class of Microporous Crystalline Inorganic Solids, *J. Am. Chem. Soc.* vol. 106 1984, 6092-6093.

Interference No. 106,002 Exhibit 2037, Mulla, S.S., et al., Regeneration mechanism of Pt/BaO/Al2O3 lean NOx trap catalyst with H2, *Catalysis Today.* vol. 136 2008, 136-145.

Interference No. 106,002 Exhibit 2028, Namba, Seitaro, et al., Catalytic Application of Hydrophobic Properties of High-Silica Zeolites, *Journal of Catalysis* vol. 72 1981, 16-20.

Interference No. 106,002 Exhibit 2029, Olson, D.H., et al., Chemical and Physical Properties of the ZSM-5 Substitutional Series, *Journal of Catalysis* vol. 61 1980, 390-396.

Interference No. 106,002 Exhibit 2033, Takahashi, Naoki, et al., The low-temperature performance of NOx storage and reduction catalyst, *Applied Catalysis B: Environmental* vol. 70 2007, 198-204.

Interference No. 106,002 Exhibit 2034, Takahashi, Naoki, et al., The new concept 3-way catalyst for automotive lean-burn engine: NOx storage and reduction catalyst, *Catalysis Today* vol. 27 1996, 63-69.

Interference No. 106,002 Exhibit 2035, Theis, Joseph R., et al., NOx Release Characteristics of Lean NOx Traps During Rich Purges, *SAE International Technical Paper Series* 2003-1-1159, 2003 *SAE World Congress Detroit, Michigan* Mar. 3-6, 2003 2003, 20 pages.

Non-Final Office Action in U.S. Appl. No. 14/274,300, dated Jul. 1, 2014, 11 pages.

Camblor et al., "A Synthesis, MAS NMR, Synchrotron Xay Powder Diffraction, and Computational Study of Zeolite SSZ-23," Chem. Mater, 1999, vol. 11, pp. 287-82885.

Zones, "Conversion of Faujasites of High-Silica Chabazite SSZ-13 in the Presence of N, N, NTrimethyl-l-AdamantammoniumLodide," J. Chem. Soc. Faraday Trans., 1991, vol. 87, No. 22 pp. 370-716.

Zones et al., "Novel ZeoliteTransformations: TheTemplate-Mediated Conversion of Cubic P zeolite to SS-Z13," Zeolites, 1988, vol. 8, pp. 166-174.

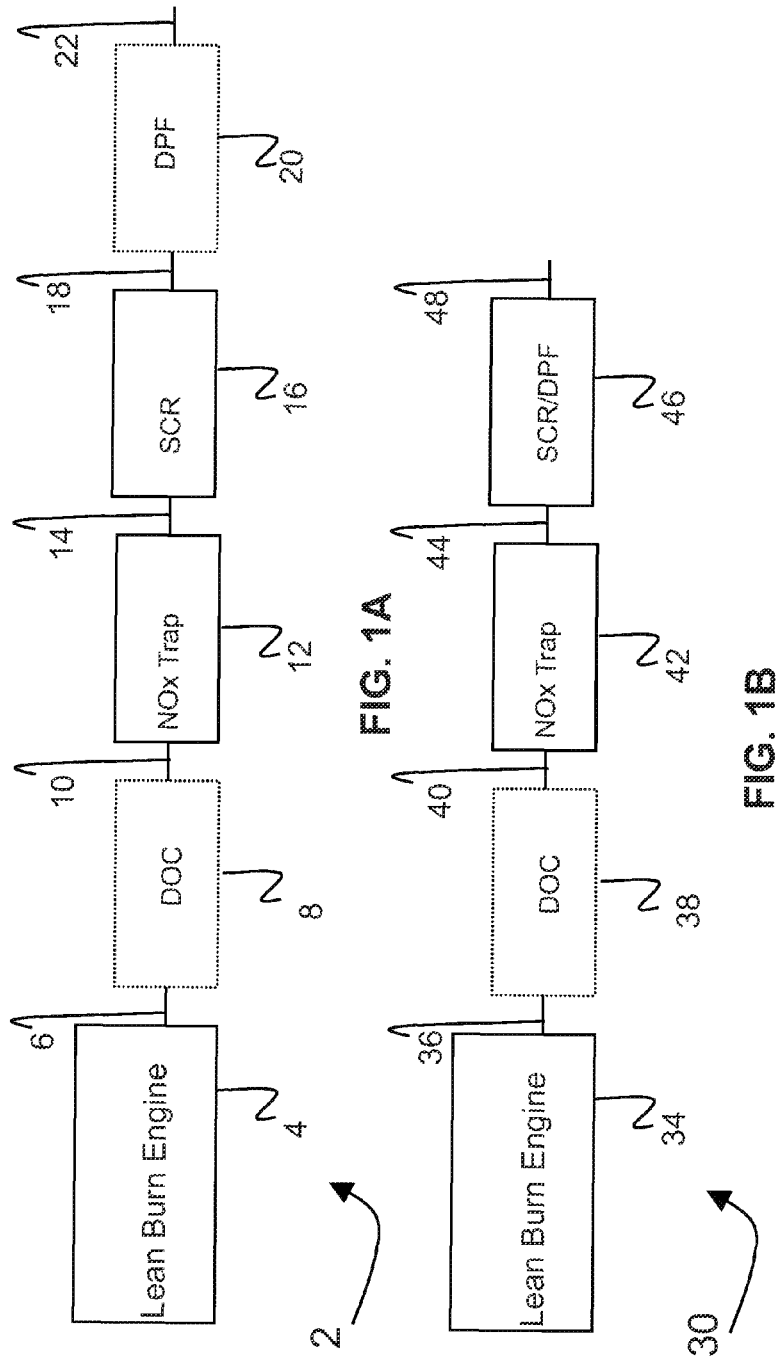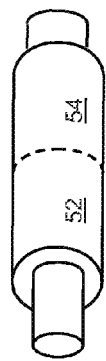

EMISSIONS TREATMENT SYSTEM WITH AMMONIA-GENERATING AND SCR CATALYSTS

CROSS REFERENCE TO RELATED APPLICATIONS

This application is a continuation of pending U.S. application Ser. No. 12/750,001, filed Mar. 20, 2010, which claims the benefit of priority under 35 USC §119(e) to U.S. Provisional Application Ser. No. 61/166,584, filed Apr. 3, 2009, which is incorporated herein by reference.

TECHNICAL FIELD

The present invention relates to emissions treatment systems having ammonia-generating and SCR catalysts, and methods useful for reducing contaminants in exhaust gas streams, especially exhaust gas streams containing nitrogen oxides (NOx). More specifically, the present invention is concerned with emissions treatment systems containing ammonia-generating catalysts such as NOx storage reduction (NSR) or lean NOx trap (LNT) catalysts in combination with Selective Catalytic Reduction (SCR) catalysts, and methods for their use with lean burn engines, including diesel engines and lean burn gasoline engines.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. Effective abatement of NOx from lean burn engines is difficult to achieve because high NOx conversion rates typically require reductant-rich conditions. Conversion of the NOx component of exhaust streams to innocuous components generally requires specialized NOx abatement strategies for operation under fuel lean conditions.

One such strategy for the abatement of NOx in the exhaust stream from lean burn engines uses NOx storage reduction (NSR) catalysts, which are also known in the art as "lean NOx trap (LNT)". NSR catalysts contain NOx sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to $NO_2$ (Equation 1), which is an important step for NOx storage. At low temperatures, this reaction is typically catalyzed by the platinum group metal component, e.g., a platinum component. The oxidation process does not stop here. Further oxidation of $NO_2$ to nitrate, with incorporation of an atomic oxygen, is also a catalyzed reaction (Equation 2). There is little nitrate formation in absence of the platinum group metal component even when $NO_2$ is used as the NOx source. The platinum group metal component has the dual functions of oxidation and reduction. For its reduction role, the platinum group metal component first catalyzes the release of NOx upon introduction of a reductant, e.g., CO (carbon monoxide) or HC (hydrocarbon) (Equation 3) to the exhaust. This step recovers NOx storage sites but induces release of NOx species. The released NOx is then further reduced to gaseous $N_2$ in a rich environment (Equations 4 and 5). NOx release can also be induced by reductants in a net oxidizing environment. However, the efficient reduction of released NOx by CO requires rich conditions. A temperature surge can also trigger NOx release because metal nitrate is less stable at higher temperatures. NOx trap catalysis is a cyclic operation. Metal compounds are believed to undergo a carbonate/nitrate conversion, as a dominant path, during lean/rich operations.

Oxidation of NO to $NO_2$ $$NO + 1/2 O_2 \rightarrow NO_2 \qquad (1)$$

NOx Storage as Nitrate $$2NO_2 + MCO_3 + 1/2 O_2 \rightarrow M(NO_3)_2 + CO_2 \qquad (2)$$

NOx Release $$M(NO_3)_2 + 2CO \rightarrow MCO_3 + NO_2 + NO + CO_2 \qquad (3)$$

NOx Reduction to $N_2$ $$NO_2 + CO \rightarrow NO + CO_2 \qquad (4)$$

$$2NO + 2CO \rightarrow N_2 + 2CO_2 \qquad (5)$$

In Equations 2 and 3, M represents a divalent metal cation. M can also be a monovalent or trivalent metal compound in which case the equations need to be rebalanced.

While the reduction of NO and $NO_2$ to $N_2$ occurs in the presence of the NSR catalyst during the rich period, it has been observed that ammonia ($NH_3$) can also form as a by-product of a rich pulse regeneration of the NSR catalyst. For example, the reduction of NO with CO and $H_2O$ is shown below in equation (6).

Reduction of NO to $NH_3$ $$CO + H_2O \rightarrow H_2 + CO_2 \qquad (6a)$$

$$2NO + 3H_2 + 2CO \rightarrow 2NH_3 + 2CO_2 \qquad (6b)$$

This property of the NSR catalyst mandates that $NH_3$, which is itself a noxious component, must also now be converted to an innocuous species before the exhaust is vented to the atmosphere.

An alternative strategy for the abatement of NOx under development of mobile applications (including treating exhaust from lean burn engines) uses selective catalytic reduction (SCR) catalyst technology. The strategy has been proven effective as applied to stationary sources, e.g., treatment of flue gases. In this strategy, NOx is reduced with a reductant, e.g., $NH_3$, to nitrogen ($N_2$) over an SCR catalyst that is typically composed of base metals. This technology is capable of NOx reduction greater than 90%, thus it represents one of the best approaches for achieving aggressive NOx reduction goals.

Ammonia is one of the most effective reductants for NOx at lean condition using SCR technologies. One of the approaches being investigated for abating NOx in diesel engines (mostly heavy duty diesel vehicles) utilizes urea as a reductant. Urea, which upon hydrolysis produces ammonia, is injected into the exhaust in front of an SCR catalyst in the temperature range 200-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

Emissions treatment systems that utilize the catalytic reduction of NOx in the exhaust to generate $NH_3$, in place of an external reservoir of $NH_3$ or $NH_3$ precursor have been described, but these systems have limitations. In such systems, a portion of the NOx component of the exhaust is used as an $NH_3$ precursor in such systems. For instance, U.S. Pat. No. 6,176,079 discloses a method for treating an exhaust gas from a combustion system that is operated alternately in lean and rich conditions. In the method, nitrogen oxides are intermediately stored during lean operation, and released during rich operation to form $NH_3$ that is stored. The stored $NH_3$ can be released, and thereby reduce nitrogen oxides during a subsequent lean operation.

European Patent Publication No. 773 354 describes a device for purifying the exhaust gas of an engine that has a three way catalyst connected to an $NH_3$ adsorbing and oxidizing ($NH_3$-AO) catalyst. The engine is operated with alternating rich and lean periods. During a rich operation the three way catalyst synthesizes $NH_3$ from NOx in the inflowing exhaust gas, and the $NH_3$ is then adsorbed on the $NH_3$-AO catalyst. During the lean operation NOx passes through the three way catalyst and the adsorbed $NH_3$ is desorbed and reduces the inflowing NOx.

International Published Patent Application WO 97/17532 discloses a method and device for purifying the exhaust gas from an engine, and in particular, describes a method and device for purifying NOx in the exhaust gas. In one embodiment, the publication describes a device that has a three way catalyst upstream of, and on the same carrier as a NOx occluding and reducing catalyst. Downstream of the NOx occluding and reducing (NOx-OR) catalyst is a $NH_3$ adsorbing and oxidation ($NH_3$-AO) catalyst. To prevent any $NH_3$ breakthrough, the device is also equipped with a $NH_3$ purifying catalyst downstream of the $NH_3$-AO catalyst. The air/fuel ratio of the cylinders of the engine are alternately and repeatedly rendered lean and rich to thereby render the exhaust gas air/fuel ratio, alternately and repeatedly rich and lean.

In the method described for this device in the WO97/17532 publication, when the air/fuel ratio of the exhaust gas is lean, NOx passes through the three way catalyst, and NOx is occluded in the NOx-OR catalyst. It is described that any NOx passing through the NOx-OR catalyst is purified in the following $NH_3$-AO catalyst. $NH_3$ is desorbed from the $NH_3$-AO catalyst when the air/fuel ratio of the exhaust gas is lean, and the desorbed $NH_3$ reduces the NOx.

When the air/fuel ratio of the exhaust gas is rich, a part of the NOx in the exhaust gas is converted to $NH_3$ in the three way catalyst. The $NH_3$ then passes into the NOx-OR catalyst, where the NOx is released, reduced and purified by the inflowing $NH_3$. Any $NH_3$ passing through the NOx-OR catalyst that is not consumed by the reduction of NOx is adsorbed on the $NH_3$-AO catalyst, or is purified further downstream in the $NH_3$ purifying catalyst.

A problem associated with methods that utilize a portion of the NOx in the exhaust gas as an $NH_3$ precursor is that, depending on operating conditions, $NH_3$ generated during rich operating periods often is insufficient to treat the NOx during lean periods (i.e., when the exhaust gas composition has a $\lambda \gg 1$). This deficiency can limit the range of operating conditions where NOx can be effectively treated by other emissions treatment systems.

As the conditions that emission treatment systems operate under vary for different vehicles powered by lean burn engines, flexible approaches for the design of emission treatment systems are needed to achieve ever more stringent requirements for NOx abatement. In particular, approaches that account for the effect on NOx storage and $NH_3$ formation during lean and rich periods of operation of altering the NSR catalyst composition offer more reliable and practical pathways to achieving this goal.

SUMMARY

Provided are emissions treatment systems that can be used in methods for treating exhaust gas from internal combustion engines, including diesel engines and lean burn gasoline engines, and methods of using these systems to treat internal combustion engine exhaust.

In one aspect, the invention relates to an emissions treatment system for an exhaust stream from, for example, a diesel engine or a lean burn gasoline engine. The system has an ammonia-generating component; and an SCR catalyst disposed downstream of the ammonia-generating component, wherein the SCR catalyst comprises a molecular sieve having the CHA crystal structure. In a specific embodiment, the ammonia-generating component is a lean NOx trap (LNT) catalyst, which also provides functionality for NOx abatement. The LNT and SCR combination can be configured as desired and as space permits in the exhaust system. For example, the LNT and SCR catalysts can each be on a separate substrate brick, or, alternatively, each can be placed in a front zone and a rear zone, respectively, on a single substrate brick. In another example, the LNT and SCR catalysts can be combined with a diesel particulate filter (DPF) that is downstream of the SCR. This combination can be such that each component is on its own substrate, or as desired, the SCR can be coated on a front zone of the DPF or along the entire length of the DPF.

In one embodiment, the ammonia-generating component comprises a lean NOx trap (LNT) catalytic material disposed on a carrier, the catalytic material comprising: an undercoat washcoat layer comprising a support material, at least one precious metal, and at least one NOx sorbent selected from the group consisting of alkaline earth elements, rare earth elements, and combinations thereof wherein the undercoat washcoat layer is on the carrier; and a top washcoat layer comprising a support material, at least one precious metal, and ceria in particulate form, the top washcoat layer being substantially free of alkaline earth components; and the SCR catalyst comprises a molecular sieve having the CHA crystal structure that comprises a copper chabazite (CuCHA) and a copper SAPO (CuSAPO), and the molecular sieve is disposed on a carrier. In specific embodiments, the CuCHA is a copper-SSZ-13 and a CuSAPO such as CuSAPO-34, which have good thermal stability. In one specific embodiment, Cu/SSZ-13 is particularly useful in light duty applications such as light duty diesel applications where the SCR should be effective at lower exhaust gas temperatures. In another specific embodiment, Cu/SAPO is useful in medium duty and heavy duty applications where the exhaust temperature will be higher.

The emissions treatment system typically has a controller to periodically lower the air/fuel ratio in the exhaust stream upstream of the ammonia-generating catalyst. In some embodiments, the controller is an engine management system that periodically operates the engine in a rich mode. The controller may also comprise an injector that periodically meters a reducing agent selected from at least one of a hydrocarbon fuel, carbon monoxide and hydrogen into the exhaust stream upstream of the NSR catalyst to form a rich gaseous stream.

In an optional embodiment, the emissions treatment system also has an oxidation catalyst either upstream of the ammonia-generating catalyst or downstream of the SCR catalyst. The oxidation catalyst may be, for example, disposed on a soot filter. In a detailed embodiment, the SCR catalyst and the oxidation catalyst are both disposed on a soot filter. In this regard, the soot filter can be zoned to have the SCR catalyst in an upstream zone and the oxidation catalyst in a downstream zone. For example, the SCR catalyst can be disposed along the first 10-90% (or 20-80%, or 30-70%, or 40-60%, or even 50%) of the axial length of the filter and the oxidation catalyst can be disposed along the back 90-10% (or 80-20%, or 70-30%, or 60-40%, or even 50%) of the axial length of the filter.

In another aspect, the invention relates to a method for converting NOx in an exhaust gas from a diesel engine or lean burn gasoline engine to $N_2$. The method includes: routing the exhaust gas stream through the emissions treatment system of the present invention. In a detailed embodiment, the method comprises (a) contacting the exhaust gas stream comprising NOx in a lean period with the ammonia-generating component that is an LNT to adsorb NOx from the exhaust gas stream; (b) periodically altering the air/fuel ratio of the exhaust stream to provide a rich gaseous stream during a rich period; (c) contacting the rich gaseous stream with the LNT to reduce the adsorbed NOx and generate $NH_3$; and (d) subsequently contacting a mixture of the $NH_3$ and the NOx in the exhaust gas with an SCR catalyst to form $N_2$.

BRIEF DESCRIPTION OF THE DRAWINGS

FIG. 1A is a schematic view showing an engine emission treatment system according to a detailed embodiment;

FIG. 1B is a schematic view showing an engine emission treatment system according to a detailed embodiment;

FIG. 2 is a schematic view showing an integrated engine emission treatment system according to an embodiment;

DETAILED DESCRIPTION

Figure 3:
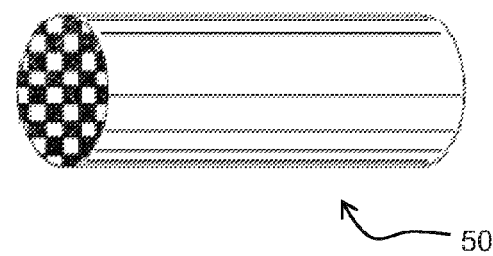
FIG. 3 is a perspective view of a wall flow filter substrate.

The invention relates to an emissions treatment system effective for the treatment of the components of exhaust gases from lean burn engines including unburned gaseous hydrocarbons, carbon monoxide, particulate matter (e.g., in diesel exhaust) and especially, NOx. The system has an upstream ammonia-generating catalyst, such as a lean NOx trap with dual catalytic function, and a downstream SCR catalyst, and is operated with alternating lean and rich exhaust gases. The LNT catalyst promotes the storage of NOx during a lean period of operation ($\lambda \gg 1.0$) according to equations (1) and (2), and during a rich period ($\lambda < 1.0$), it catalyzes not only the reduction of stored NOx to $N_2$ (equation 5), but also the formation of $NH_3$ (equation 6). Applicants have recognized that through selection of components of LNT catalyst and lean/rich operating conditions, adequate amounts of $NH_3$ can be generated when the exhaust gas is rendered rich.

As to the SCR catalysts, not all of known SCR catalysts that have previously proven to effectively treat NOx in a lean exhaust are suitable for use downstream of an LNT catalyst. For instance, base metal (e.g., copper, iron) exchanged zeolite compositions (e.g Cu—Y and Fe-beta) or vanadia-based compositions (e.g., $V_2O_5/WO_3/TiO_2/SiO_2$) are insufficient to provide the desirable $NH_3$ conversion. These SCR catalysts either do not have sufficient thermal stability during the lean and rich LNT operation or exhibit low $NH_3$ storage to capture the produced $NH_3$ from LNT. Thus, the art continues to search for a SCR catalyst that can be used effectively in combination with the LNT. The selection of suitable SCR catalyst components, such as Cu-SSZ-13 or Cu/SAPO-34, that provide good thermal stability permits locating the SCR catalyst close to the LNT catalyst where it can be subjected to high temperature and rich conditions associated with LNT catalyst regeneration and/or particulate filter burn-off. In addition, it has been discovered that Cu/SSZ-13-based SCR catalyst can reduce hydrocarbon (HC) slip during the rich conditions. Such an SCR catalyst, therefore, not only benefits an LNT catalyst-based system from a NOx and $NH_3$ standpoint, but also from a HC standpoint. Moreover, it has been discovered that catalyst systems comprising Cu-CHA SCR or Cu-SAPO SCR placed behind an LNT can substantially reduce and/or effectively eliminate large $NH_3$ breakthrough (ammonia spike) during the cyclic operations where large amounts of $NH_3$ generated by the LNT during the rich transient.

The approaches described herein offer flexible, efficient, and predictable ways for designing emissions treatment systems capable of accommodating exhaust gases emitted from a variety of lean burn engines, including diesel engines and lean burn gasoline engines.

The following terms shall have, for the purposes of this application, the respective meanings set forth below.

"Lean gaseous streams" including lean exhaust streams mean gas streams that have a $\lambda > 1.0$.

"Lean periods" refer to periods of exhaust treatment where the exhaust gas composition is lean, i.e., has a $\lambda > 1.0$.

"Platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Rich gaseous streams" including rich exhaust streams mean gas streams that have a $\lambda < 1.0$.

"Rich periods" refer to periods of exhaust treatment where the exhaust gas composition is rich, i.e., has a $\lambda < 1.0$.

"Washcoat" has its usual meaning in the art of a thin, adherent coating of a catalytic or other material applied to a refractory substrate, such as a honeycomb flow through monolith substrate or a filter substrate, which is sufficiently porous to permit the gas stream being treated to pass through.

Reference to an "ammonia-generating component" means a part of the exhaust system that supplies ammonia ($NH_3$) as a result of its design and configuration driven by engine operations. Such a component excludes gas dosing or other externally supplied sources of $NH_3$. Examples of ammonia-generating components include NOx storage reduction (NSR) catalysts, lean NOx trap (LNT) catalysts.

Turning to FIG. 1A, an exhaust gas stream containing gaseous pollutants (e.g., unburned hydrocarbons, carbon monoxide, nitrogen oxides) and particulate matter is conveyed via line 6 from a lean burn engine 4 to an optional oxidation catalyst (DOC) catalyst 8. The exhaust stream is next conveyed via line 10 to a NOx trap 12, which adsorbs NOx during lean periods, and reduces NOx to $N_2$, desorbs NOx and generates $NH_3$ during rich periods. Some of the NOx during lean periods can remain unadsorbed, resulting in NOx slip. The exhaust stream including NOx slip or $NH_3$, depending on the conditions, is routed through line 14 into an SCR catalyst 16. The $NH_3$ is adsorbed in the SCR. During lean periods, any NOx slip from the NOx trap can be reduced to $N_2$ by the $NH_3$ in the SCR. Optionally, a diesel particulate filter (DPF) (also referred to as a soot filter) 20, which received the exhaust stream through line 18, is provided downstream of the SCR 16. The particulate filter can be catalyzed with a soot burning catalyst for regeneration. Line 22 leads to the tail pipe and out of the system.

In FIG. 1B, an emissions treatment system 30 comprises a diesel engine 34 that conveys exhaust through line 36 to an optional DOC catalyst 38, which receives the exhaust stream through line 36. Line 40 leads the exhaust stream to the NOx trap 42, which in turn feeds the exhaust through line 44 to an SCR/DPF combination. In the SCR/DPF combination, the SCR catalyst can be coated onto the DPF in a front zone or along the entire length of the DPF.

In an alternative embodiment shown in FIG. 2, the LNT 52 and SCR 54 catalysts may be disposed in separate zones on the same substrate 50, where the LNT catalyst is disposed on the upstream segment of the substrate, and the SCR catalyst is disposed on the downstream segment.

The emissions treatment system as shown in FIGS. 1A and 1B can optionally can contain an oxidation (DOC) catalyst 8 and 38 upstream of the NOx trap catalyst 12 and 42. DOC compositions are well known in the art and may comprise platinum group metals as catalytic agents and optionally base metals (e.g., ceria). In the upstream position (i.e., as 12 and 42), the DOC provides several advantageous functions. The catalyst serves to oxidize unburned gaseous and non-volatile hydrocarbons (i.e., the soluble organic fraction of the diesel particulate matter) and carbon monoxide to carbon dioxide and water. Removal of substantial portions of the SOF using the DOC catalyst, in particular, assists in preventing too great a deposition of particulate matter on the NOx trap and SCR catalysts. In another function, DOC can protect and prolong the useful life of the NOx trap catalyst.

Alternatively (not shown), the DOC can be located downstream of the SCR catalyst, where the DOC not only serves to combust unburned hydrocarbon and CO as described above, but also serves as an ammonia slip oxidation catalyst to prevent any unreacted $NH_3$ from venting to the atmosphere, especially with DOC compositions containing platinum group metal components.

In certain embodiments of the invention, the DOC is coated on a soot filter, for example, a wall flow filter to assist in the removal of the particulate material in the exhaust stream, and, especially the soot fraction (or carbonaceous fraction) of the particulate material. The DOC, in addition to the other oxidation function mentioned above, lowers the temperature at which the soot fraction is oxidized to $CO_2$ and $H_2O$. As soot accumulates on the filter, the catalyst coating assists in the regeneration of the filter. Although the soot filter may be located downstream of the SCR catalyst it is preferred that the catalyzed soot filter be located upstream of the NOx trap catalyst to minimize or prevent fouling of the NOx trap catalyst and the SCR catalyst downstream with particulate material.

Substrates

Preferably, each of the LNT and the SCR catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

Figure 4:
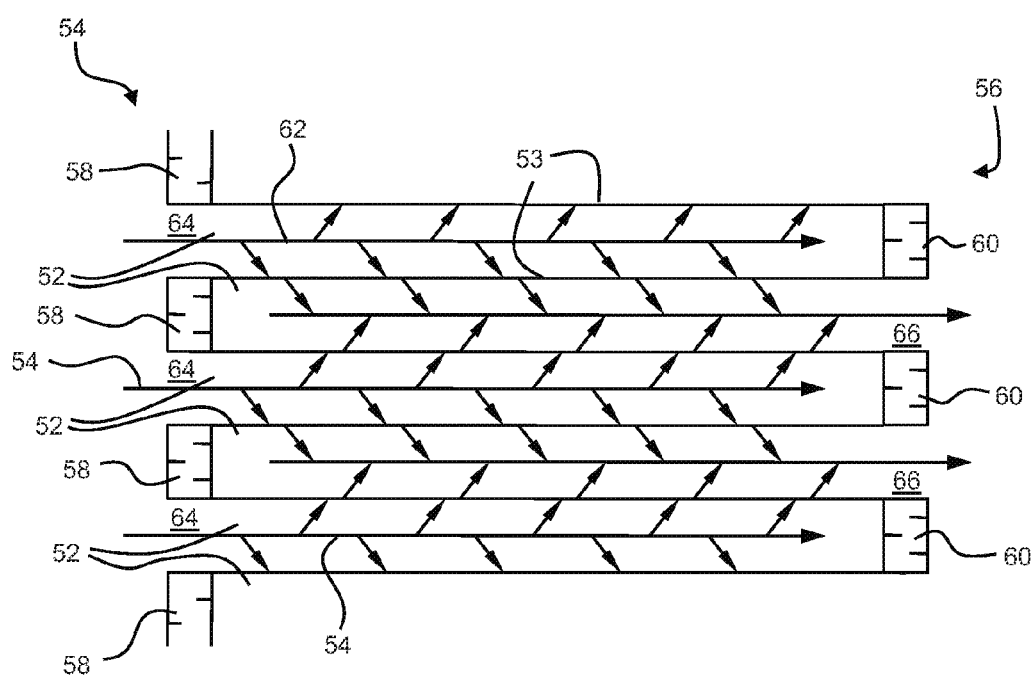
FIG. 4 is a cut-away view of a section of a wall flow filter substrate.

FIGS. 3 and 4 illustrate a wall flow filter substrate 50 which has a plurality of having alternately blocked channels 52 and can serve as a DPF. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. If such substrate is utilized, the resulting system will be able to remove particulate matters along with gaseous pollutants. Thus a suitable wall flow filter is a honeycomb substrate having has a plurality of longitudinally extending passages formed by longitudinally extending walls bounding and defining said passages, wherein the passages comprise inlet passages having an open inlet end and a closed outlet end, and outlet passages having a closed inlet end and an open outlet end Other suitable filters in addition to honeycomb wall flow filters, include, but are not limited to wound or packed fiber filters, open cell foams, sintered metal filters, etc.

Wall flow filter substrates can be composed of ceramic-like materials such as cordierite, α-alumina, silicon carbide, aluminum titanate, silicon nitride, zirconia, mullite, spodumene, alumina-silica-magnesia or zirconium silicate, or of porous, refractory metal. Wall flow substrates may also be formed of ceramic fiber composite materials. Specific wall flow substrates are formed from cordierite, silicon carbide, and aluminum titanate. Such materials are able to withstand the environment, particularly high temperatures, encountered in treating the exhaust streams.

Wall flow substrates for use in the inventive system can include thin porous walled honeycombs (monoliths) through which the fluid stream passes without causing too great an increase in back pressure or pressure across the article. Ceramic wall flow substrates used in the system can be formed of a material having a porosity of at least 50% (e.g., from 50 to 75%) having a mean pore size of at least 5 microns (e.g., from 5 to 30 microns). In a specific embodiment, the substrates can have a porosity of at least 59% and have a mean pore size of between 10 and 20 microns. When substrates with these porosities and these mean pore sizes are coated with the techniques described below, adequate levels of desired catalyst compositions can be loaded onto the substrates. These substrates are still able retain adequate exhaust flow characteristics, i.e., acceptable back pressures, despite the catalyst loading. U.S. Pat. No. 4,329,162 is herein incorporated by reference with respect to the disclosure of suitable wall flow substrates.

The porous wall flow filter can be catalyzed in that the wall of the element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more washcoats of catalytic materials and combinations of one or more washcoats of catalytic materials on the inlet and/or outlet walls of the element.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. A representative commercially-available metal substrate is manufactured by Emitec. However, it will be understood that the invention is not limited to a particular substrate type, material, or geometry. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, one or both of the LNT or SCR catalyst compositions may be deposited on an open cell foam substrate. Such substrates are well known in the art, and are typically formed of refractory ceramic or metallic materials.

The use of the LNT catalysts described herein provides a significant advantage for the design of emissions treatment systems for lean burn engines. As the LNT catalyst has both a NOx storage function during lean periods of operation and an $NH_3$ generating function during rich periods of operation, inclusion of separate catalyst substrates to perform these two functions is unnecessary. As a consequence, the burden of preparing and housing separate catalyst substrates is absent. Moreover, overall platinum group metal usage is diminished with the dual function LNT catalyst; since catalysts that promote NOx storage and catalysts that promote $NH_3$ formation both generally have platinum group metal components in their compositions. Emissions treatment systems that have a single LNT catalyst instead of separate catalysts for NOx storage and $NH_3$ formation therefore can afford the system designer with significant cost savings.

The air/fuel ratio of the exhaust gas composition may be altered to provide a rich gaseous stream by a number of methods known to those of skill in the art. Controllers that periodically operate the lean burn engine in a rich mode, or more directly alter the air/fuel ratio of the exhaust stream can be used. For instance, the air/fuel ratio can be made rich by periodically operating the engine in a rich mode using well known engine management controls. Alternatively, the exhaust gas stream may be rendered rich by periodically metering a hydrocarbon reductant (e.g., diesel fuel) upstream of the NSR catalyst.

The amount of $NH_3$ produced during a rich period depends both on the length and intensity of the rich pulse use to generate the rich gaseous stream. For purposes of operating the emissions treatment system of the invention during a rich period, the rich gaseous stream generally has a $\lambda$ of from 0.80 to 0.995. Preferably, the rich gaseous stream has a $\lambda$ of from 0.90 to 0.95. During a lean period, the lean gaseous stream preferably has a $\lambda$ much greater than 1, for example in the range of 1.5 to 1.8 or higher. The length of the rich period is generally 1 to 10% of the lean period. Such operating parameters ensure that adequate levels of $NH_3$ are generated with minimum fuel penalty.

Space velocities for treating NOx with the inventive emissions treatment system through the NSR catalyst are from 10,000 to 200,000 $h^{-1}$. More preferably, the space velocity of the exhaust gas is from 10,000 to 100,000 $h^{-1}$. The space velocities of the exhaust gas through the SCR catalyst are preferably from 10,000 to 300,000 $h^{-1}$, and more preferably, from 15,000 to 150,000 $h^{-1}$.

LNT Catalyst Composition

The LNT catalyst composition used in the inventive system contains a NOx sorbent and a platinum group metal component dispersed on a refractory metal oxide support. In addition, the LNT catalyst composition optionally contains other components such as oxygen storage components that significantly affect the quantity of $NH_3$ formed during a rich period of operation.

The LNT catalyst may take any form such as self-supporting particles (e.g., tablets, beads) or as a solid honeycomb monolith formed of the catalyst composition. However, the LNT catalyst composition is preferably disposed as a washcoat or as a combination of washcoats (to form a layered catalyst composite) on a ceramic or metallic substrate. In preferred embodiments of the invention the LNT catalyst is either in the form of a single layer, or a bi-layer catalyst composite with the bottom layer adhered to the substrate and the top layer overlying to the bottom layer.

The LNT catalyst composition comprises at least a NOx trapping component (e.g. Ba, Mg etc) and a support. The support is composed of at least a high surface area refractory metal oxide such as alumina, titania, zirconia; mixtures of alumina with one or more of titania, zirconia and ceria; ceria coated on alumina or titania coated on alumina. The refractory metal oxide may contain an oxide or a mixed oxide such as silica-alumina, aluminosilicates which may be amorphous or crystalline, alumina-zirconia, alumina-chromia, alumina-ceria and the like. The preferred refractory metal oxides are gamma alumina, ceria coated on alumina and titania coated on alumina. It is advantageous that the preferred support may contain dispersed alkaline earth elements (e.g. Barium) and the catalyst may further comprise ceria in particulate form.

Typically, the refractory metal oxide will have a specific surface area of about 50 to about 300 $m^2/g$. The support is typically presents in an amount of about 1.5 to about 7.0 $g/in^3$, this amount being the total amount in embodiments with two or more catalyst layers. In embodiments of the invention where there are two layers, the support chosen for the bottom layer need not be, but is conveniently, the same as that chosen for the top layer. Moreover, the amount of the support in the bottom layer need not be the same as that in the top layer, so long as the amounts of the supports in the bottom and top layers are sufficient for providing desirable performance.

Dispersed on the support will be one or more platinum group metal components, e.g., platinum, palladium, rhodium and mixtures thereof. These components of the LNT catalyst promote oxidation and reduction of nitrogen species. The amount of loading of the platinum group metal component will be in the range of about 10 to about 250 g/ft$^3$, and preferably, the amount will be in the range of 50 to 200 g/ft$^3$, these amounts being the total amount in embodiments with two or more catalyst layers. Here again, in embodiments of the invention where a bi-layer catalyst composite is used, the platinum group metal component chosen for the bottom layer need not be, but is conveniently, the same as that chosen for the top layer. Moreover, the amount of the platinum group metal component in the bottom layer need not be the same as that in the top layer, so long as the amounts of the platinum group metal components in the bottom and top layers are within the foregoing range.

For the purposes of the present invention, the LNT catalyst also contains at least one NOx sorbent component to ensure an adequate NOx storage capacity. In addition, the NOx storage capacity significantly affects the ability of the LNT catalyst to form NH$_3$, since the formation of NH$_3$ during a rich period of operation is in part limited by the supply of stored NOx (i.e., as a metal nitrate). Typically, the NOx sorbent component is present in an amount of at least 0.1 g/in$^3$, such as from 0.1 to 4.0 g/in$^3$ to ensure adequate NOx storage. More preferably there is at least about 0.2 g/in$^3$ of NOx sorbent, and still more preferably at least 0.3 g/in$^3$ of NOx sorbent in the composition. A suitable NOx sorbent component comprises a basic oxygenated compound of alkaline earth element selected from magnesium, calcium, strontium or barium and mixtures thereof and an oxygenated compound of rare earth element consisting of cerium. The cerium may further contain lanthanum, neodymium and praseodymium as impurity.

A component of the LNT catalyst composition that affects NOx storage and formation of NH$_3$ is the ceria. While the ceria component improves the NOx trapping capacity at lower temperatures, too great a concentration of the component may limit the quantity of NH$_3$ that can be formed during normal lean and rich operation. Applicants believe that the presence of too high an amount of the ceria component will consume a large portion of the reductants during the rich transient. As a result, an additional amount of reductant is needed to induce the formation of an adequate amount of NH$_3$, which results in an increase in fuel penalty.

The ceria component may be dispersed on the refractory metal oxide support by, for example, dispersing a soluble precursor (e.g., cerium nitrate) on the refractory metal oxide support. Alternatively, the component is provided in particulate form in the composition. By particulate form it is meant that a composition is in a solid, preferably as fine particles which can be as small as 1 to 15 microns in diameter or smaller, as opposed to being dispersed in solution in the base metal washcoat. Other rare earth elements as an impurity may be present in the ceria.

In some embodiments, the ceria component may be composed of a bulk fine particulate material of co-formed rare earth metal-zirconia composite (e.g., a ceria-zirconia composite) such as are commercially available or are readily apparent to those of skill in the art. For instance, co-formed composites are described in U.S. Pat. No. 5,057,483. These particles do not react with stabilized alumina washcoat and can maintain a BET surface area of above 40 m$^2$/g upon exposure to 900° C. for a long period of time.

Other components that may be added to the LNT composition include other transition metals such as zirconium. If used, such transition metal components are typically present in an amount of about 0.01 to about 0.5 g/in$^3$.

The LNT catalyst composites may be readily prepared by processes well known in the prior art.

Specific desired LNT compositions are similar to those disclosed in U.S. Provisional Patent Application Ser. No. 61/076,560 (Wan), filed Jun. 27, 2008, which is incorporated herein by reference. Such LNT compositions exhibit good NOx storage/NOx reduction activity at exhaust temperature of 100 to 600° C., and more particularly, at temperatures of 150 to 450° C. In addition, such LNT catalyst compositions exhibit outstanding thermal stability and the ability to remove sulfur compounds under moderate conditions. Interestingly, ceria in the LNT in particulate form with the presence of platinum group metals not only enhances the NOx trapping efficiency at lower temperatures (especially below 250° C.) in a net lean conditions, but also can activate the conversion of adsorbed nitrogen oxides in a net rich condition at the same low temperature.

The LNT catalyst composition can comprise a top washcoat layer and an undercoat washcoat layer. The top washcoat layer comprises at least one supported precious metal catalyst and ceria as a NOx trapping component. The top washcoat layer is substantially free of any alkaline earth components, which are believed to hinder the conversion of adsorbed nitrogen oxides over the precious metal components in a net rich conditions at low temperatures (typically <250° C.). The top washcoat composition is capable of oxidizing NOx at temperatures below 200° C. Additionally, the top washcoat layer is capable of effectively reducing unburned carbon monoxides at temperatures below 200° C. The undercoat layer comprises at least one NOx trapping component in intimate contact with at least one supported precious metal catalyst for the treatment of exhaust gas emissions. Preferably, the undercoat layer comprises at least one alkaline earth element and/or rare earth element as NOx trapping components.

In one embodiment, the lean NOx trap/catalyst may comprise a trapping/catalyst composition, which comprises two distinct washcoat layers coated on a single substrate or carrier member, one layer (e.g., a top washcoat layer) over top of the other (e.g., an undercoat washcoat layer). In this embodiment, the undercoat washcoat layer is coated over the entire axial length of a substrate (e.g., a flow-through monolith) and the top washcoat layer is coated over the entire axial length of the undercoat washcoat layer. In accordance with the present invention, top washcoat layer comprises at least one supported precious metal for the treatment of exhaust gas emissions, and optionally may contain zirconia, but is devoid of any alkali or alkaline earth components. The undercoat layer may contain at least one NOx trapping component or NOx adsorbent, which selectively adsorbs and converts nitrogen oxides from exhaust gas streams at higher operating temperatures. The undercoat washcoat layer may also contain at least one precious metal catalyst for the treatment of exhaust gas emissions. Under lean burn conditions, the washcoat layers of the present invention can simultaneously store nitrogen oxides (NOx) and catalyzes the conversion of hydrocarbons and carbon monoxide in exhaust gas streams. Under adequate rich regeneration conditions; stored NOx may be converted by the catalysts contained in both the top and undercoat washcoat layers.

The LNT catalyst composite can be readily prepared in layers on a monolithic honeycomb substrate. For the bottom layer, finely divided particles of a high surface area refractory metal oxide such as gamma alumina and other catalyst components are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide, e.g., about 1.5 to about 6.0 g/in$^3$. Components such as the platinum group metals, transition metal oxides, stabilizers, promoters and the NOx sorbent component may be incorporated in the slurry as a mixture of water soluble or water-dispersible compounds or complexes. Thereafter the coated substrate is calcined by heating, e.g., at 400 to 600° C. for 1 to 3 hours.

Typically, the platinum group metal component, e.g., platinum component, is dispersed on the refractory metal oxide, e.g., activated alumina, using a platinum group metal salt or complex (or platinum group metal precursor). For the purposes of the present invention, the term "platinum group metal precursor" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A preferred method of forming the bottom layer of the layered catalyst composite of the invention is to prepare a mixture of a solution of a platinum group metal precursor and at least one finely divided, high surface area, refractory metal oxide support, e.g., gamma alumina, which is sufficiently dry to absorb substantially all of the solution to form a slurry. Preferably, the slurry is acidic, having a pH of about 3 to less than 7. The pH of the slurry may be lowered by the addition of a minor amount of an inorganic or organic acid such as hydrochloric or nitric acid, preferably acetic acid, to the slurry. Thereafter, the NOx sorbent component, and optional transition metal components, stabilizers and/or promoters may be added to the slurry.

In a particularly preferred embodiment, the slurry is thereafter comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 25-45 wt. %.

The top layer is thereafter prepared and deposited on the bottom layer of the calcined composite in a manner similar to that described above. After all coating operations have been completed, the composite is then again calcined by heating, e.g., at 400 to 600° C. for 1-3 hours.

SCR Catalyst

Not all of known SCR catalysts that were proven to effectively treat NOx in a lean exhaust are suitable for use in downstream of the LNT catalyst. For instance, base metal (e.g., copper, iron) exchanged zeolite compositions (e.g Cu—Y and Fe-beta) or vanadia-based compositions (e.g., $V_2O_5/WO_3/TiO_2/SiO_2$) are insufficient to provide the desirable $NH_3$ conversion. These SCR catalysts either do not have sufficient thermal stability during the lean and rich LNT operation or exhibit low $NH_3$ storage to capture the produced $NH_3$ from LNT. Thus, the art continues to search for a SCR catalyst that can be used effectively in combination with the LNT.

In a specific embodiment of the emissions treatment system the SCR catalyst is formed from a base metal exchanged zeolite material. Such SCR catalyst compositions are described, for example, in United States Patent Application Pub. No. 2008/0202107 (Boorse), which is hereby incorporated by reference. Compositions disclosed in Boorse include Cu-exchanged chabazite molecular sieve. In a preferred embodiment, the zeolite includes a copper component. In a particularly specific embodiment, the Cu/CHA is a copper-SSZ-13. Molecular sieves exhibiting structures similar to chabazite such as SAPO are also found effective. Thus, in a specific embodiment, the Cu/SAPO is a copper-SAPO-34.

When deposited on the honeycomb monolith substrates, such SCR catalyst compositions are deposited at a concentration of at least 0.5 $g/in^3$ to ensure that the desired $NH_3$ reduction is achieved and to secure adequate durability of the catalyst over extended use. One preferred embodiment provides that the SCR catalyst is loaded onto a carrier in an amount in the range of 0.5 to 2.5 $g/in^3$ (or 0.5 to 2.0 $g/in^3$, or even 0.5 to 1.5 $g/in^3$). In a specific embodiment, the SCR compositions are disposed on a wall flow monolith (e.g. a DPF).

Another particularly useful catalyst in accordance with one or more embodiments of the invention comprises a molecular sieve having the CHA crystal structure. Molecular sieves having the CHA crystal structure can include non-zeolitic molecular sieves (e.g. SAPO). Molecular sieves having the CHA crystal structure also include zeolites.

According to one or more embodiments, washcoats of metal-loaded zeolitic molecular sieves having the CHA structure can be prepared using a binder. According to one or more embodiments, use of a $ZrO_2$ binder derived from a suitable precursor such as zirconyl acetate or any other suitable zirconium precursor such as zirconyl nitrate. In one embodiment, zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Keeping the washcoat intact is beneficial because loose or free coating could plug the CSF itself if the CSF contains the SCR coating, or plug the downstream CSF if a flow-through SCR catalyst is placed in front of the CSF, causing the backpressure to increase. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Furthermore, binder compositions may include any combination of zirconia, alumina, and silica.

Molecular Sieves Having the CHA Crystal Structure

One embodiment of the invention relates to a catalyst comprising a zeolite having the CHA crystal structure and a mole ratio of silica to alumina greater than about 15 and an atomic ratio of copper to aluminum exceeding about 0.25. In a specific embodiment, the mole ratio of silica to alumina is from about 15 to about 256 and the atomic ratio of copper to aluminum is from about 0.25 to about 0.50. In a more specific embodiment, the mole ratio of silica to alumina is from about 25 to about 40. In an even more specific embodiment, the mole ratio of silica to alumina is about 30. In one particular embodiment, the atomic ratio of copper to aluminum is from about 0.30 to about 0.50. In a specific embodiment, the atomic ratio of copper to aluminum is about 0.40. In a specific embodiment, the mole ratio of silica to alumina is from about 25 to about 40 and the atomic ratio of copper to aluminum is from about 0.30 to about 0.50. In another specific embodiment, the silica to alumina is about 30 and the atomic ratio of copper to alumina is about 0.40.

In a particular embodiment, the catalyst contains ion-exchanged copper and an amount of copper sufficient to maintain NOx conversion performance of the catalyst in an exhaust gas stream containing nitrogen oxides after hydrothermal aging of the catalyst. In a particular embodiment, the catalyst contains at least about 2.00 weight percent copper oxide.

In one embodiment, a catalyst article comprises a honeycomb substrate having a zeolite having the CHA crystal structure deposited on the substrate, the zeolite having a mole ratio of silica to alumina greater than about 15 and an atomic ratio of copper to aluminum exceeding about 0.25 and containing an amount of copper exceeding ion-exchanged capacity. In a specific embodiment, excessive copper may be present in an amount sufficient to prevent hydrothermal degradation of the structure of the catalyst. The catalyst may further comprise a binder.

In one embodiment of the invention, zeolites having the CHA structure such as chabazite are provided. In one or more embodiments, a zeolite having the CHA crystal structure and a mole ratio of silica to alumina greater than about 15 and an atomic ratio of copper to aluminum exceeding about 0.25 is provided. In specific embodiments, the mole ratio of silica to alumina is about 30 and the atomic ratio of copper to aluminum is about 0.40. Other zeolites having the CHA structure, include, but are not limited to SSZ-13, LZ-218, Linde D, Linde R, Phi, ZK-14, and ZYT-6.

In another embodiment of the invention, a catalyst article comprises a honeycomb substrate having a non-zeolitic molecular sieves having the CHA crystal structure such as SAPO deposited on the substrate. In a specific embodiment, a sufficient amount of copper is present to prevent hydrothermal degradation of the structure of the catalyst and to sustain the performance of the catalyst. The catalyst may further comprise a binder.

Synthesis of the molecular sieves having the CHA structure can be carried out according to various techniques known in the art. For example, in a typical SSZ-13 synthesis, a source of silica, a source of alumina, and an organic directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate, and aluminum alkoxides. Sodium hydroxide is typically added to the reaction mixture, but is not required. A typical directing agent for this synthesis is adamantyltrimethylammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 150 and 180° C. Typical reaction times are between 1 and 5 days.

At the conclusion of the reaction, the product is filtered and washed with water. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 700° C. range.

CuCHA zeolite catalysts and CuSAPO molecular sieve catalysts in accordance with one or more embodiments of the invention can be utilized in catalytic processes which involve oxidizing and/or hydrothermal conditions, for example in temperatures in excess of about 600° C., for example, above about 800° C. and in the presence of about 10% water vapor. More specifically, it has been found that the catalysts which have been prepared in accordance with embodiments of the invention have superior hydrothermal stability compared to CuY and FeBeta zeolites. CuCHA zeolite catalysts and CuSAPO molecular sieve catalysts prepared in accordance with embodiments of the invention when combined with the LNT as a catalyst system can yield improved total NOx reduction activity and substantially reduce or eliminate the large release of ammonia, especially after aging under high temperatures of at least about 600° C., for example, about 800° C., and high water vapor environments of about 10% or more. CuCHA and CuSAPO have high intrinsic activities that enable use of lower amounts of catalyst material, which in turn should reduce backpressure of honeycomb substrates coated with washcoats of the catalysts. In one or more embodiments, hydrothermal aging at high temperature refers to exposure of catalyst to a temperature of about 800° C. in a high water vapor environments of about 10% or more, for at least about 1 to about 24 hours.

Experimentation has indicated that improved performance of CuCHA catalysts in accordance with embodiments of the invention is associated with Cu loading. While Cu can be exchanged to increase the level of Cu associated with the exchange sites in the structure of the zeolite, it has been found that it is beneficial to leave non-exchanged Cu in salt form, for example, as $CuSO_4$ within the zeolite catalyst. Upon calcination, the copper salt decomposes to CuO, which may be referred to herein as "free copper" or "mobile copper." According to one or more embodiments, this free Cu is both active and selective, resulting in low $N_2O$ formation when used in the treatment of a gas stream containing nitrogen oxides. Unexpectedly, this "free" Cu has been found to impart greater stability in CuCHA catalysts subjected to thermal aging at temperatures up to about 800° C.

While embodiments of the invention are not intended to be bound by a particular principle, it is believed that the relatively small channel openings of the molecular sieve having CHA structure do not permit large molecular weight hydrocarbons (HCs) typical of diesel fuel to enter and adsorb within the CHA structure. Unlike other zeolites like Beta or ZSM5, CHA catalysts prepared according to embodiments of the invention have a relatively low affinity for adsorbing these large molecular weight HC species. This is a beneficial property for use in selective catalytic reduction (SCR) catalysts.

In use, the exhaust gas stream can be contacted with a catalyst prepared in accordance with embodiments of the present invention. For example, the CuCHA and CuSAPO catalysts made in accordance with embodiments of the present invention are well suited to treat the exhaust of engines, including diesel engines.

Without intending to limit the invention in any manner, embodiments of the present invention will be more fully described by the following examples.

EXAMPLES

An emissions system was formed by preparing, in accordance with methods set forth herein, an oxidation catalyst, an LNT catalyst having an undercoat washcoat layer in conjunction with a topcoat washcoat layer and an SCR catalyst comprising copper-SSZ-13 (CuCHA) or copper-SAPO-34 (Cu-SAPO).

Example 1

The oxidation catalyst was disposed on a flow-through monolith substrate, having a volume of 50 in$^3$ (0.83 L), a cell density of 300 cells per square inch, and a wall thickness of approximately 125 μm. The catalyst contained a washcoat of 2.5 g/in$^3$ activated alumina bearing 40 g/ft$^3$ Pt and 8 g/ft$^3$ Pd and 0.5 g/in$^3$ H-beta zeolite.

The layered LNT catalyst was disposed on a flow-through monolith substrate, having a volume of 152 in$^3$ (2.5 L), a cell density of 400 cells per square inch, and a wall thickness of approximately 100 μm. The undercoat contained a washcoat of 3.84 g/in$^3$ activated alumina containing 10% ceria and 18% BaO, 1.1 g/in$^3$ ceria (87% of the ceria being in particulate form), 0.24 g/in$^3$ MgO, and 0.096 g/in$^3$ ZrO$_2$. The undercoat washcoat contained 34.3 g/ft$^3$ Pt and 4.3 g/ft$^3$ Pd. The topcoat contained a washcoat of 0.7 g/in$^3$ activated alumina bearing 21.7 g/ft$^3$ Pt and 2.7 g/ft$^3$ Pd and 0.5 g/in$^3$ ceria bearing 7.0 g/ft$^3$ Rh, with no substantial alkaline earth component being present in the topcoat washcoat. The resulting layered LNT catalyst contained a total of 56 g/ft$^3$ Pt, 7 g/ft$^3$ Pd and 7 g/ft$^3$ Rh.

The CuCHA SCR catalyst was disposed on a flow-through monolith substrate, having a volume of 91.5 in$^3$ (1.5 L), a cell density of 400 cells per square inch, and a wall thickness of approximately 150 μm. The CHA zeolite was the SSZ-13 composition. The copper loading on the zeolite was 3.2 wt % and the total washcoat loading on the monolith was 2.4 g/in$^3$.

The CuSAPO SCR catalyst was disposed on a flow-through monolith substrate, having a volume of 91.5 in$^3$ (1.5 L), a cell density of 400 cells per square inch, and a wall thickness of approximately 150 μm. The SAPO molecular sieve exhibited SAPO-34 composition having a silica to alumina molar ratio of about 0.67. The copper loading on the molecular sieve was 2.2 wt % and the total washcoat loading was 2.0 g/in$^3$.

Example 2

Comparative

An emissions system was formed by preparing the LNT catalyst of Example 1 in the absence of any of the SCR catalysts.

Example 3

Testing

Core samples were taken from each of the flow-through catalysts above-mentioned in Example 1. The size of the individual core sample was 0.75" (D)×0.42" (L) for DOC, 0.75" (D)×1.25" (L) for LNT and 0.75" (D)×0.75" (L) for SCR. Three sets of system samples were assembled in individual laboratory reactor respectively. The distance of each catalyst elements in the laboratory reactor was 0.25". The emissions systems of Example 1 of this invention (i.e. DOC+LNT+Cu-CHA and DOC+LNT+Cu-SAPO) and Comparative Example 2 (i.e. (DOC+LNT only) were individually aged. The aging procedures consisted of two steps. First, the catalyst system was aged at 800° C. in flowing air with 10% steam for 5 hours. Then, the catalyst system was subjected to a cyclic aging protocol consisting of a sulfation mode (1 g S/L loading) at 300° C. and desulfation mode (cycle between 10 seconds lean and 15 seconds rich (λ=0.9) for 5 minutes) at 700° C. (LNT bed temperature). The cyclic aging ran for 40 cycles. After the aging the catalyst system was evaluated on a reactor test rig with FTIR analytical apparatus. The evaluations were conducted with 12 cycles of a 120 seconds lean gas exposure and then followed by a 5 seconds rich gas exposure. The lean gas consisted of 200 ppm NO, 5% CO2, 5% H$_2$O, 10% O$_2$ and balance N$_2$. The rich gas (λ=0.95) contained 2.36% CO, 0.78% H$_2$, 0.95% O$_2$, 5% CO$_2$, 5% H$_2$O, 1500 ppm C$_3$H$_6$ balance N$_2$. The space velocity during the test was kept constant at 60,000 hr$^{-1}$ (based on LNT volume). The percentage of NH$_3$ formation was monitored throughout the test and reported as a cycle average number based on the total NOx input in the test. The NOx trapping capacity of the system was measured after the end of 12$^{th}$ rich exposure and presented as the amount of NOx removed from the system when 80% cycle NOx conversion was reached.

Figure 5A:
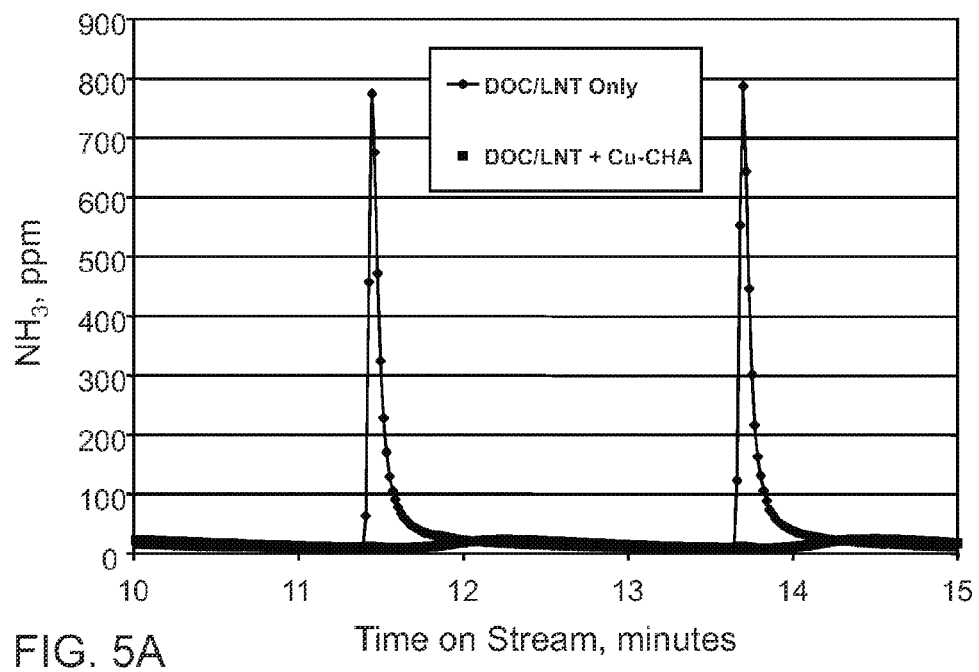
FIG. 5A is graph showing ammonia removal from a system including copper SSZ-13 catalyst.
Figure 5B:
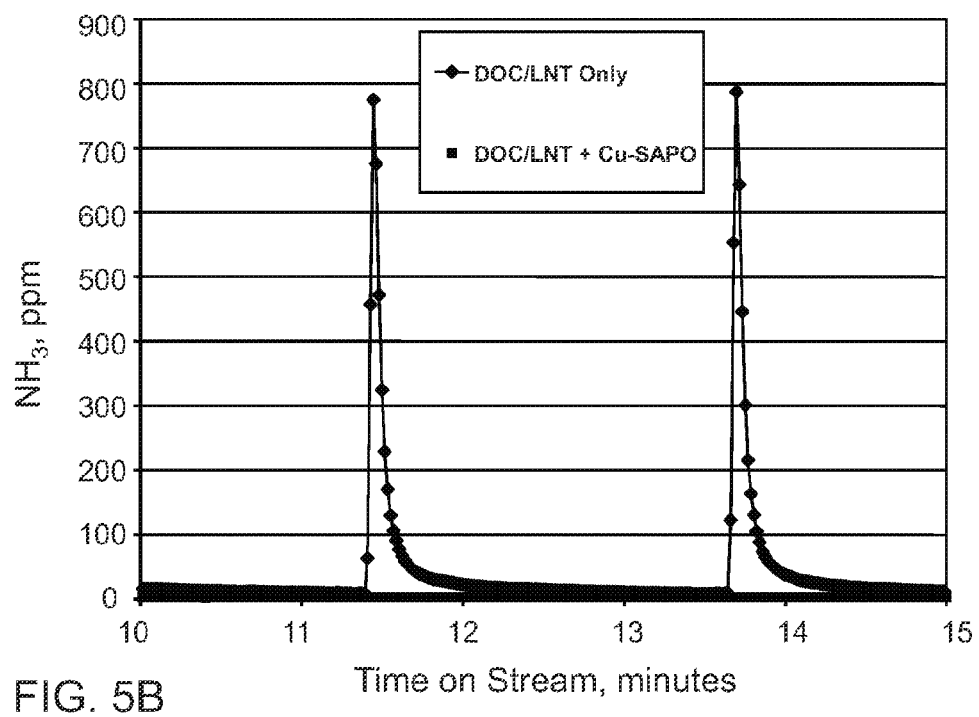
FIG. 5B is graph showing ammonia removal from a system including Cu SAPO catalyst.
Figure 5C:
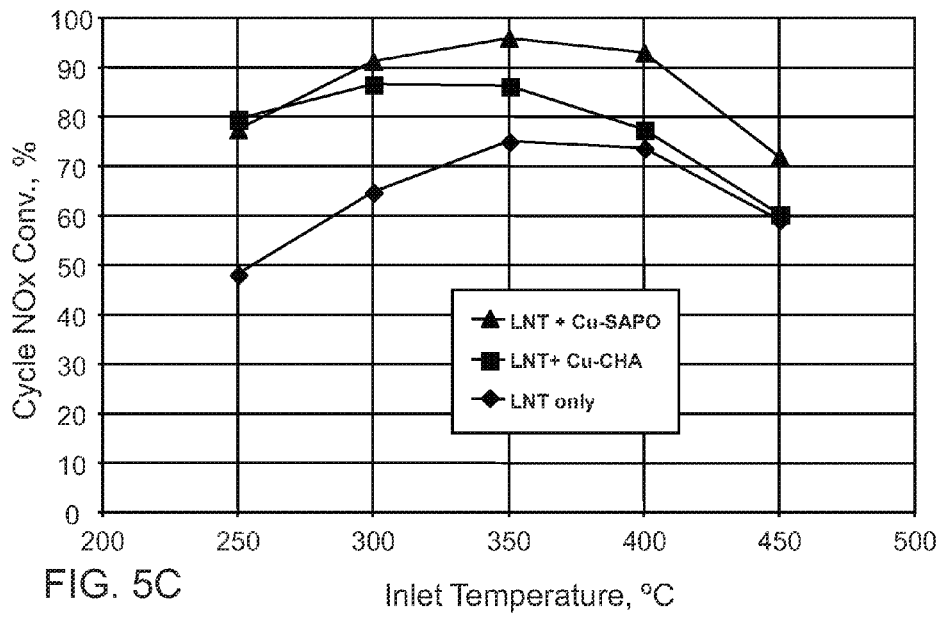
FIG. 5C is a graph showing cycle NOx conversion for various samples to show the effect of a downstream SCR catalyst in accordance with one or more embodiments.
Figure 5D:
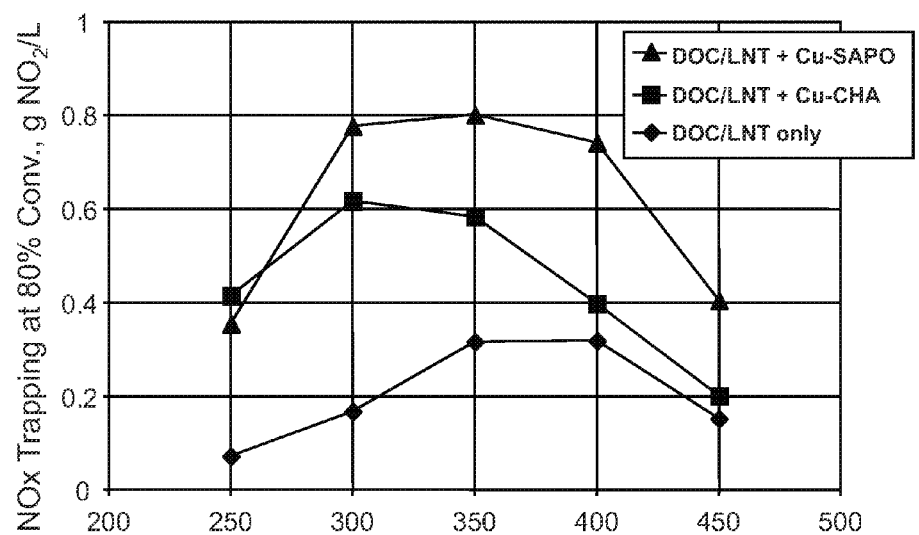
FIG. 5D is a graph showing NOx trapping at 80% conversion for various samples to show the effect of a downstream SCR catalyst in accordance with one or more embodiments.

As shown in FIG. 5A and FIG. 5B, the catalyst system comprising Cu-CHA SCR or Cu-SAPO SCR (shown as the heavy or thick line in FIGS. 5A and 5B) placed behind the LNT of Example 1 substantially reduced and/or effectively eliminated large NH$_3$ breakthrough (ammonia spike) during the cyclic operations where large amounts of NH$_3$ generated by the LNT during the rich transient. As can be seen in the Figures, according to embodiments including CuCHA SCR or CuSAPO SCR placed downstream of the LNT can substantially reduce and/or eliminate ammonia spikes during rich transient operation. As used herein, substantially reduce refers to a reduction of at least about 50%, 60%, 70%, 80% and 90% or greater in ammonia produced during rich transient operation. By eliminating a spike in ammonia emissions, the possibility of exceeding a regulatory limit for ammonia emissions can be avoided. Thus, by selecting the proper SCR catalyst and amount of catalyst the ammonia spike can be suppressed below a predetermined limit. As indicated in FIG. 5C and FIG. 5D, the catalyst system comprising Cu-CHA or Cu-SAPO placed behind the LNT of Example 1 greatly improved the system performance and significantly enhanced the system NOx trapping capacity.

Example 4

An emissions system was formed by preparing, in accordance with methods set forth herein, an LNT catalyst having a 2-layered structure and a downstream SCR catalyst comprising copper-SSZ-13 (CuCHA) on a diesel particulate filter (DPF).

The LNT catalyst was disposed on a flow-through monolith substrate, having a volume of 152 in$^3$ (2.5 L), a cell density of 400 cells per square inch, and a wall thickness of approximately 100 μm. The preparation of the LNT was essentially the same as that described in Example 1 except the PGM loading. The undercoat contained 63 g/ft$^3$ Pt and 6.5 g/ft$^3$ Pd and the topcoat bore 40 g/ft$^3$ Pt and 4 g/ft$^3$ Pd on activated alumina and 6.5 g/ft$^3$ on ceria. The resulting layered LNT catalyst contained a total of 103 g/ft$^3$ Pt, 10.5 g/ft$^3$ Pd and 6.5 g/ft$^3$ Rh.

The CuCHA SCR catalyst was disposed on a wall-flow filter substrate, having a volume of 152 in³ (2.5 L), a cell density of 300 cells per square inch, and a wall thickness of approximately 300 μm. The washcoat loading on the filter was about 1.5 g/in³ and containing 3 wt % Cu. The SCR was coating along 100% of the length of the DPF.

Example 5

Comparative

An emissions system was formed by preparing the LNT catalyst of Example 4 and in the absence of the downstream SCR catalyst on a filter to show the effect of the downstream SCR catalyst on a filter.

Example 6

Testing

Figure 6:
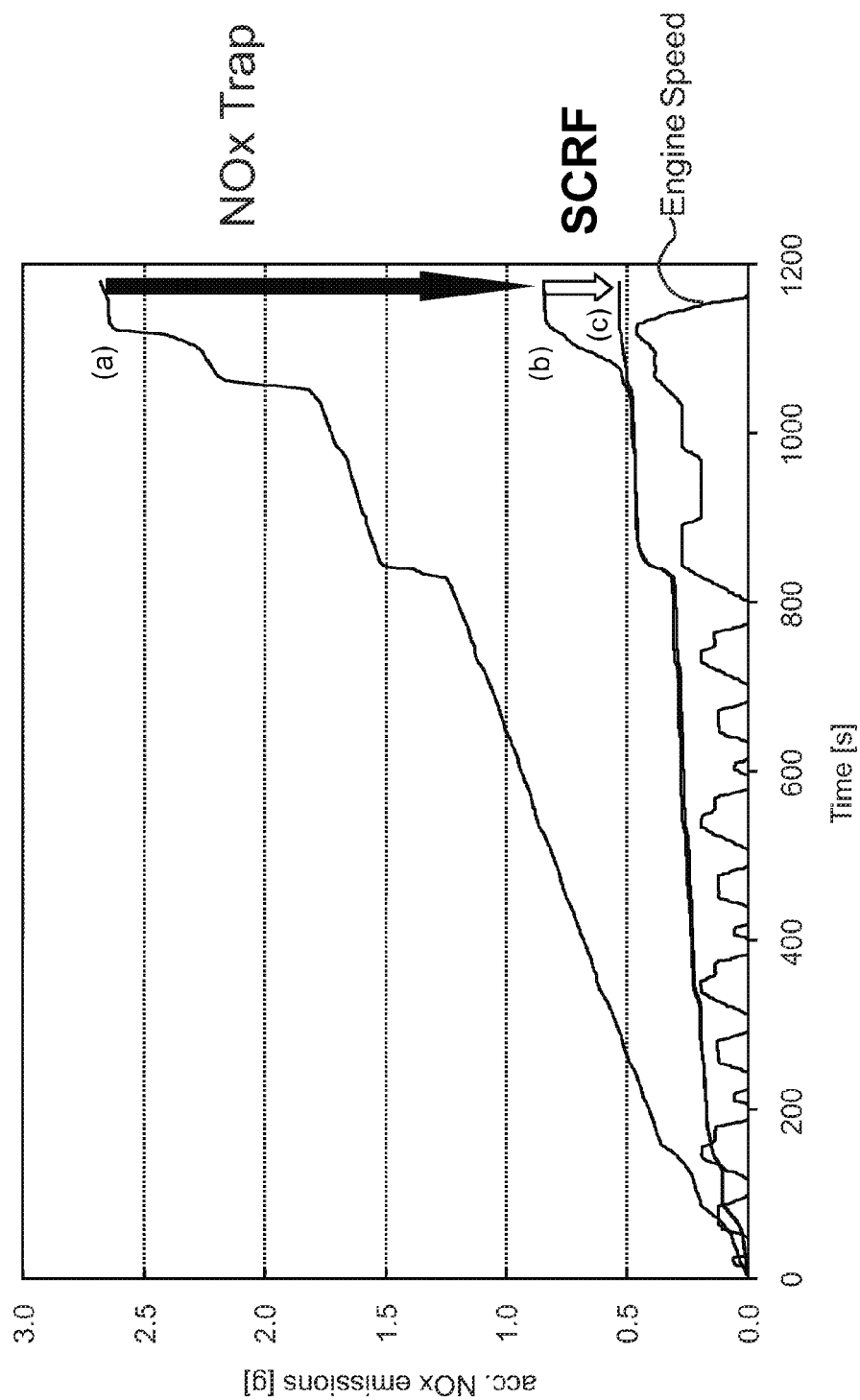
FIG. 6 is a graph showing accumulated NOx emissions in grams for Examples 4 and 5.

The emissions systems of Example 4 and comparative Example 5 were tested on a transient engine test cell in New European Drive Cycle (NEDC) conditions. A 6-cylinder state of the art engine was used. FIG. 6 shows accumulated NOx emissions over the course of the engine test, where the engine speed is shown by the bottom-most line and where NOx emissions are measured at (a) engine out, (b) after the NOx trap, and (c) after the SCRF. As show in FIG. 6, the total NOx conversion of the combined system of Example 4 was about 80%, which is depicted by the accumulated NOx emissions being reduced from approximately 2.67 g to approximately 0.56 g on line (c) at the end of the test cycle, whereas the system of comparative Example 5 was about 68%, which is depicted by the accumulated NOx emissions being reduced from approximately 2.67 g to approximately 0.86 g on line (b) at the end of the test cycle.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. An emissions treatment system for an exhaust stream of a diesel engine or a lean burn gasoline engine comprising:
   an in-situ ammonia-generating component, wherein the ammonia-generating component comprises a lean NOx trap (LNT) catalytic material disposed on an upstream carrier that is a flow through monolith, wherein the lean NOx trap (LNT) catalytic material comprises an undercoat washcoat layer and a top washcoat layer, the top washcoat layer exhibiting better low temperature NOx abatement performance than the undercoat washcoat layer; and
   an SCR catalyst disposed downstream of the ammonia-generating component, wherein the SCR catalyst comprises a molecular sieve having the CHA crystal structure, wherein the SCR catalyst is effective to reduce a spike in ammonia during cyclic operation of the engine between lean and rich operation.

2. The emissions treatment system of claim 1, wherein the SCR catalyst is present in an amount in the range of 0.5 to 2.5 g/in³.

3. The emissions treatment system of claim 1, wherein the molecular sieve comprises a copper chabazite (CuCHA), and the CuCHA is disposed on a downstream carrier.

4. The emissions treatment system of claim 3, wherein the molecular sieve is a copper SSZ-13.

5. The emissions treatment system of claim 1, wherein the molecular sieve comprises a copper SAPO (CuSAPO), and the CuSAPO is disposed on a downstream carrier.

6. The emissions treatment system of claim 5, wherein the molecular sieve is copper SAPO-34.

7. The emissions treatment system of claim 1, wherein the downstream carrier comprises a wall flow filter having a plurality of longitudinally extending passages formed by longitudinally extending walls bounding and defining said passages, wherein the passages comprise inlet passages having an open inlet end and a closed outlet end, and outlet passages having a closed inlet end and an open outlet end.

8. The emissions treatment system of claim 7, wherein the filter is coated by the SCR catalyst in the range of about 10% to 100% of the axial length.

9. The emissions treatment system of claim 1, wherein the SCR catalyst is disposed on a downstream carrier, and the downstream carrier comprises a wall flow filter having a plurality of longitudinally extending passages formed by longitudinally extending walls bounding and defining said passages, wherein the passages comprise inlet passages having an open inlet end and a closed outlet end, and outlet passages having a closed inlet end and an open outlet end, and
   the filter is coated with the SCR catalyst along the axial length in the range of 60 to 40% from an upstream end and with an oxidation catalyst along the axial length in the range of 40 to 60% from a downstream end.

10. The emissions treatment system of claim 1, wherein the undercoat washcoat layer comprises a support material, at least one precious metal, and at least one NOx sorbent selected from the group consisting of oxides of magnesium, calcium, strontium, barium, lanthanum, cerium, praseodymium, neodymium, and combinations thereof, wherein the undercoat washcoat layer is on the carrier; and
   the top washcoat layer comprises a support material, at least one precious metal, and ceria in particulate form, the top washcoat layer being substantially free of alkaline earth components.

11. A method of converting NOx in an exhaust gas stream from a diesel engine or lean burn gasoline engine to $N_2$ comprising: routing the exhaust gas stream through the emissions treatment system of claim 1.

12. The method of claim 11, wherein the SCR catalyst is effective to reduce a spike in ammonia by at least about 50% or greater.

13. The emissions treatment system of claim 1, wherein the SCR catalyst is effective to reduce a spike in ammonia by at least about 50% or greater.

14. The emissions treatment system of claim 1, wherein the ammonia-generating component comprises a platinum group metal selected from platinum, palladium and rhodium.

15. The emissions treatment system of claim 1, wherein the top washcoat layer comprises a platinum group metal component selected from rhodium on a ceria support.

16. The emissions treatment system of claim 15, wherein the top washcoat layer further comprises a second platinum group metal component selected from platinum on a gamma-alumina support.

17. The emissions treatment system of claim 15, wherein the undercoat washcoat layer comprises platinum on a gamma-alumina support, and ceria, baria and zirconia.

18. The emissions treatment system of claim 17, wherein the baria is present in an amount of 0.3 to 4.0 g/ft$^3$.

19. The emissions treatment system of claim 17, wherein the amount of loading of the platinum group metal component is in the range of 50 to 200 g/ft$^3$ total amount in the top and undercoat washcoat layers.

20. The emissions treatment system of claim 1, wherein the ammonia-generating component comprises platinum, palladium and rhodium.

21. The emissions treatment system of claim 20, wherein the platinum, palladium and rhodium are present in an amount in the range of 50 to 200 g/ft$^3$.

22. The emissions treatment system of claim 21, wherein the top washcoat layer is substantially free of any alkaline earth components.

23. The emissions treatment system of claim 22, wherein the top washcoat layer is capable of oxidizing NOx at temperatures below 200° C.

24. A method of converting NOx in an exhaust gas stream from a diesel engine or lean burn gasoline engine to N2 comprising: routing the exhaust gas stream through the emissions treatment system of claim 20.

25. The emissions treatment system of claim 1, wherein the molecular sieve is a zeolite having a mole ratio of silica to alumina from about 15 to about 256.

26. The emissions treatment system of claim 25, wherein the zeolite comprises copper in an atomic ratio of copper to aluminum in the range of 0.25 to 0.50.

27. The emissions treatment system of claim 26, wherein the zeolite has a mole ratio of silica to alumina from about 25 to about 40.

* * * * *